United States Patent
Wu et al.

(10) Patent No.: US 11,375,426 B2
(45) Date of Patent: Jun. 28, 2022

(54) METHOD AND APPARATUS FOR MOBILITY MECHANISM IN THE SCENARIO INCLUDING BOTH EPC AND 5GC

(71) Applicant: Lenovo (Beijing) Limited, Beijing (CN)

(72) Inventors: Lianhai Wu, Beijing (CN); Jing Han, Beijing (CN); Haiming Wang, Beijing (CN); Zhuoyun Zhang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 16/764,355

(22) PCT Filed: Nov. 15, 2017

(86) PCT No.: PCT/CN2017/111162
§ 371 (c)(1),
(2) Date: May 14, 2020

(87) PCT Pub. No.: WO2019/095162
PCT Pub. Date: May 23, 2019

(65) Prior Publication Data
US 2020/0275335 A1    Aug. 27, 2020

(51) Int. Cl.
*H04W 4/00* (2018.01)
*H04W 36/24* (2009.01)
(Continued)

(52) U.S. Cl.
CPC ....... *H04W 36/24* (2013.01); *H04W 36/0061* (2013.01); *H04W 36/0085* (2018.08); *H04W 36/08* (2013.01)

(58) Field of Classification Search
CPC ............. H04W 36/24; H04W 36/0085; H04W 36/0061; H04W 36/08; H04W 48/20; H04W 48/12
(Continued)

(56) References Cited

U.S. PATENT DOCUMENTS 8,892,069 B2 *  11/2014  Godin ................... H04W 24/02
                                                            455/410
2012/0208535 A1    8/2012  Martin
(Continued)

FOREIGN PATENT DOCUMENTS

CN       106162783 A     11/2016
EP         2224770 A1     9/2010

OTHER PUBLICATIONS

PCT/CN2017/111162, "International Search Report and the Written Opinion of the International Search Authority" ISA/CN, State Intellectual Property Office of the P.R. China, dated Aug. 3, 2018, pp. 1-6.
(Continued)

*Primary Examiner* — Marcos Batista
(74) *Attorney, Agent, or Firm* — Kunzler Bean & Adamson (57) ABSTRACT

Methods and apparatus for a mobility mechanism in the scenario including both enhanced packet core ("EPC") and 5GC are disclosed. One method of a UE comprising receiving system information including a cell list from an eNB/ng-eNB, wherein, the cell list includes an identifier of a cell connected to EPC or an identifier of a cell connected to 5GC. Further, the identifier is a Physical Cell Identifier ("PCI") of the cell, and the cell indicated in the cell list includes a serving cell for the UE and/or one or more neighbour cells of the serving cell. Further, the eNB/ng-eNB from which the system information is received can be the eNB/mg-eNB
(Continued)

managing the serving cell for the UE or the eNB/mg-eNB managing the neighbour cells of the serving cell.

26 Claims, 5 Drawing Sheets

(51) Int. Cl.
*H04W 36/00* (2009.01)
*H04W 36/08* (2009.01)

(58) Field of Classification Search
USPC .................................. 370/331; 455/436–445
See application file for complete search history.

(56) References Cited

U.S. PATENT DOCUMENTS

| | | | |
|---|---|---|---|
| 2013/0231115 A1* | 9/2013 | Lin ....................... | H04W 36/24 |
| | | | 455/436 |
| 2014/0036874 A1 | 2/2014 | Kyeongin et al. | |
| 2014/0092871 A1 | 4/2014 | Wang et al. | |
| 2014/0293908 A1 | 10/2014 | Kumar et al. | |
| 2014/0295840 A1 | 10/2014 | Keskitalo et al. | |
| 2017/0019819 A1 | 1/2017 | Yang et al. | |
| 2018/0091249 A1* | 3/2018 | Han ..................... | H04J 11/0076 |

OTHER PUBLICATIONS

ZTE, Consideration on CN type indication, 3GPP TSG-RAN WG2 Meeting #99, R2-1708151, Aug. 21-25, 2017, pp. 1-9.

\* cited by examiner

METHOD AND APPARATUS FOR MOBILITY MECHANISM IN THE SCENARIO INCLUDING BOTH EPC AND 5GC

FIELD

The subject matter disclosed herein relates generally to wireless communication and more particularly relates to the mobility mechanisms in the scenario, including both enhanced packet core ("EPC") and 5GC.

BACKGROUND

The following abbreviations are herewith defined, at least some of which are referred to within the following Description: Third Generation Partnership Project ("3GPP"), User Entity/Equipment (Mobile Terminal) ("UE"), Access Stratum ("AS"), Access Network ("AN"), Core Network ("CN"), Radio Resource Control ("RRC"), Radio Access Network ("RAN"), Downlink ("DL"), Uplink ("UL"), Receiving ("RX"), Transmitting ("TX"), Reference Signal Receiving Power ("RSRP"), Reference Signal Receiving Quality ("RSRQ"), Common Pilot Channel ("CPICH"), System Information Block ("SIB"), Next Generation Evolved Node B ("ng-eNB"), Evolved Node B ("eNB"), Evolved Packet Core ("EPC"), Fifth Generation Mobility Communication ("5G"), Fifth Generation Core ("5GC"), Public Land Mobile Network ("PLMN"), VISITED Public Land Mobile Network ("VPLMN"), Long Term Evolution ("LTE"), Single Cell-Point to Multi-Points ("SC-PTM") and Radio Access Technology ("RAT").

The 5G system is being designed to support a higher data rate, lower latency and other enhancements, such as a flexible system architecture. A central idea in the design of 5G has been to minimize dependencies between AN and CN with a common AN-CN interface, which integrates different 3GPP and non-3GPP access types. In other words, 5GC, which is a common CN, is being designed to support multiple RATs.

The flexible system deployment in 5G enables LTE eNB to be connected to 5GC, which is also referred to as a ng-eNB. The communication between a ng-eNB and 5GC makes it possible to implement some new features. Therefore, a new study on cell reselection between a cell managed by an eNB and a cell managed by a ng-eNB is required.

BRIEF SUMMARY

The mechanisms for both inter-frequency and inter-RAT cell reselection have been defined in 3GPP TS36.304 and TS36.331, wherein a main objective is to enable UE to be camped on a higher priority cell in the process of cell reselection. A further objective is to implement a cell-level ranking criteria R in the case that a serving cell for UE and neighbour cells thereof have a same priority. However, the cell reselection between a serving cell managed by an eNB and neighbour cells thereof managed by a ng-eNB, and vice versa, have not been developed.

Similar with legacy cell reselection, cell reselection involved in a cell connected to EPC and a cell connected to 5GC depends on a few information elements ("IE") included in system information transmitted from eNB/ng-eNB. Further, the cell managed by a ng-eNB can support new features considering the ng-eNB connected to 5GC. Therefore, the frequency for the cell managed by a ng-eNB is assigned with a priority not lower than that of the frequency for the cell managed by an eNB.

In the case that the frequency for the neighbour cell has a higher priority than the frequency for the serving cell—which means the neighbour cell may be managed by a ng-eNB in the context of the present disclosure—UE would attempt to be camped on the neighbour cell with a higher priority. Concerning another aspect, in the case that the frequency for the neighbour cell has a same priority with the frequency for the serving cell, UE applies the cell-level ranking criteria R ("criteria R") as described hereinafter so that UE is camped on the cell with the maximum $R_n$. Further, to increase the probability that UE can be camped on the cell managed by a ng-eNB, an offset value is applied when calculating the cell-level ranking criteria value for the cell connected to 5GC.

Methods and apparatus for mobility mechanism in the scenario, including both enhanced packet core ("EPC") and 5GC, are disclosed. One method of a UE comprises: receiving system information including a cell list from an eNB/ng-eNB, wherein, the cell list includes an identifier of a cell connected to EPC or an identifier of a cell connected to 5GC. Further, the identifier is a Physical Cell Identifier ("PCI") of the cell, and the cell indicated in the cell list includes a serving cell for the UE and/or one or more neighbour cells of the serving cell. Further, the eNB/ng-eNB from which the system information is received can be the eNB/mg-eNB managing the serving cell for the UE or the eNB/mg-eNB managing the neighbour cells of the serving cell.

BRIEF DESCRIPTION OF THE DRAWINGS

A more particular description of the embodiments briefly described above will be rendered by reference to specific embodiments that are illustrated in the appended drawings. Given that these drawings depict only some embodiments and are not therefore to be considered to limit scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or a program product. Accordingly, embodiments may take the form of an all-hardware embodiment, an all-software embodiment (including firmware, resident software, micro-code, etc.), or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field-programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer-readable storage devices storing machine-readable code, computer-readable code, and/or program code, collectively referred to hereafter as "code". The storage devices may be tangible, non-transitory, and/or non-transmission. The storage devices may not embody signals. In a certain embodiment, the storage devices only employ signals for accessing code.

Any combination of one or more computer-readable medium may be utilized. The computer-readable medium may be a computer-readable storage medium. The computer-readable storage medium may be a storage device storing the code. The storage device may be, for example, but is not limited to being, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, random-access memory ("RAM"), read-only memory ("ROM"), an erasable programmable read-only memory ("EPROM" or flash memory), a portable compact disc read-only memory ("CD-ROM"), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Reference throughout this specification to "one embodiment", "an embodiment", or similar language, means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but not limited to", unless expressly specified otherwise. An enumerated listing of items does not imply that any or all of the items are mutually exclusive, unless expressly specified otherwise. The terms "a", "an", and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions—executed via the processor of the computer or other programmable data-processing apparatus—create a means for implementing the functions/acts specified in the schematic flowchart diagrams and/or schematic block diagrams.

The code may also be stored in a storage device that can direct a computer, other programmable data-processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data-processing apparatus, or other devices to cause a series of operational steps to be performed on the computer, other programmable apparatus, or other devices to produce a computer implemented process such that the code executed on the computer or other programmable apparatus provides processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, from the illustrated Figures.

The description of elements in each figure may refer to elements of proceeding figures. Like numbers refer to like elements in all figures, including alternate embodiments of like elements.

Enhancements to cell reselection between a cell managed by an eNB connected to EPC and a cell managed by a ng-eNB connected to 5GC should be studied to provide more features to UE, wherein, EPC is the packet core of the legacy LTE network and an eNB is a LTE network equipment for radio access, while 5GC is the packet core of 5G network and a ng-eNB is also a LTE network equipment but has an interface with 5GC. Disclosed herein are methods, apparatus, and system that provide a mobility mechanism in the scenario including both enhanced packet core ("EPC") and 5GC. As described herein, the frequency for the cell managed by a ng-eNB has a higher priority than the frequency for the cell managed by the eNB, or a same priority with the frequency for the cell managed by the eNB. UE would perform different mechanisms for cell reselection based on the priority of the serving cell and neighbour cells. Further, an offset value would be applied when calculating the cell-level ranking criteria value for the cell connected to 5GC in the case that the priority of the serving cell is same with that of the neighbour cells. In the scope of the present disclosure, the expression of the priority of frequency, the priority for the cell, the priority of the frequency for the cell can be used alternatively, and the expression of the cell connected to the EPC/5GC and the eNB/ng-eNB thereof connected to the EPC/5GC can be used alternatively.

Figure 1:
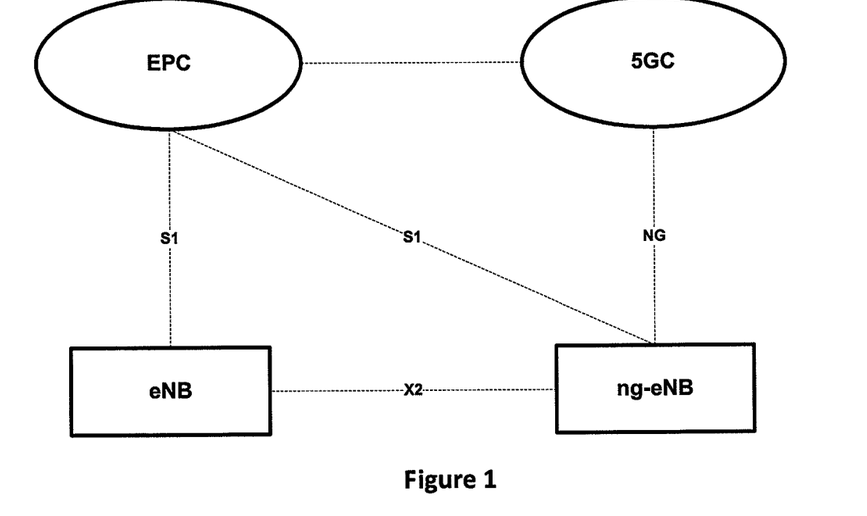
FIG. 1 is a schematic diagram illustrating a connection between ng-NB and 5GC/EPC according to one embodiment.

FIG. 1 is a schematic diagram illustrating a connection between ng-NB and 5GC/EPC according to one embodiment. As shown in FIG. 1, an eNB, which is a LTE network equipment for radio access has an S1 interface with EPC, while a ng-eNB, which is also an LTE network equipment for radio access, has both an S1 interface with EPC and NG interface with 5GC, which makes it possible for a ng-eNB to provide new features.

Figure 2:
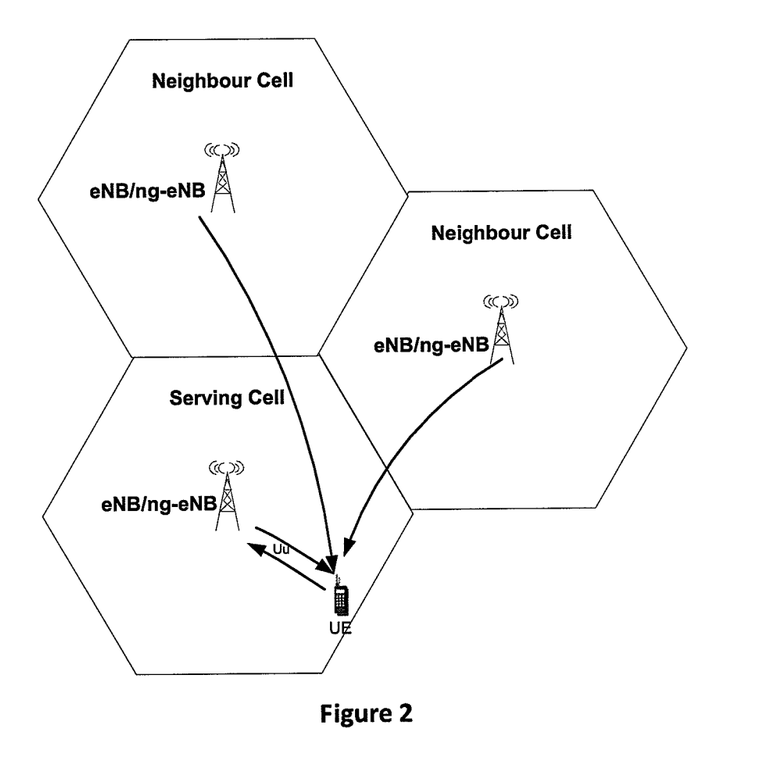
FIG. 2 is a schematic diagram illustrating that a UE receives signals/messages from a serving cell and/or neighbour cells according to one embodiment, wherein, both the serving cell and the neighbour cells can be managed by an eNB/a ng-eNB.

FIG. 2 is a schematic diagram illustrating that a UE receives signals/messages from a serving cell and/or neighbour cells according to one embodiment, wherein, both the serving cell and the neighbour cells can be managed by an eNB/a ng-eNB. As shown in FIG. 2, the serving cell for UE may be either an eNB or a ng-eNB, and the neighbour cells of the serving cell may also be either an eNB or a ng-eNB. The UE has a Uu interface with the eNB/ng-eNB managing the serving cell, and meanwhile receives signals from the eNB/ng-eNB managing neighbour cells in order to monitor the wireless signal strength of the neighbour cells or for another purpose.

The wireless signal strength can be represented by RSRP and/or RSRQ, both of which can be measured on CPICH. The UE in an idle mode will perform the procedure of cell selection and cell reselection. During the procedure of cell selection, the UE will select a cell meeting the cell selection criteria S to be camped on. The criteria S required to be satisfied in the procedure of cell selection is as follows:

$$S_{rxlev} > 0 \text{ AND } S_{qual} > 0$$

wherein, $$S_{rxlev} = Q_{rxlevmeas} - (Q_{rxlevmin} + Q_{rxlevminoffset}) - P_{compensation} - Qoffset_{temp}$$
$$S_{qual} = Q_{qualmeas} - (Q_{qualmin} + Q_{qualminoffset}) - Qoffset_{temp}$$

Equation 1

The parameters in Equation 1 are defined as following

TABLE 1

| | |
|---|---|
| $S_{rxlev}$ | Cell selection RX level value (dB) |
| $S_{qual}$ | Cell selection quality value (dB) |
| $Qoffset_{temp}$ | Offset temporarily applied to a cell (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |

TABLE 1-continued

| | |
|---|---|
| $Q_{rxlevminoffset}$ | Offset to the signaled Qrxlevmin taken into account in the Srxlev evaluation as a result of a periodic search for a higher priority PLMN while camped normally in a VPLMN |
| $Q_{qualminoffset}$ | Offset to the signalled Qqualmin taken into account in the Squal evaluation as a result of a periodic search for a higher priority PLMN while camped normally in a VPLMN |
| $P_{compensation}$ | If the UE supports the additional Pmax in the NS-PmaxList, if present, in SIB1, SIB3 and SIB5:<br>$\max(P_{EMAX1} - P_{PowerClass}, 0) - (\min(P_{EMAX2}, P_{PowerClass}) - \min(P_{EMAX1}, P_{PowerClass}))$ (dB); else:<br>$\max(P_{EMAX1} - P_{PowerClass}, 0)$ (dB) |
| $P_{EMAX1}, P_{EMAX2}$ | Maximum TX power level a UE may use when transmitting on the uplink in the cell (dBm) defined as $P_{EMAX}$ in TS 36.101 [33]. $P_{EMAX1}$ and $P_{EMAX2}$ are obtained from the p-Max and the NS-PmaxList respectively in SIB1, SIB3 and SIB5 as specified in TS 36.331 |
| $P_{PowerClass}$ | Maximum RF output power of the UE (dBm) according to the UE power class as defined in TS 36.101 |

In Equation 1, the parameters other than $S_{rxlevmeas}$ and $S_{qualmeas}$ can be obtained from the system information from an eNB/a ng-eNB.

After completion of cell selection, e.g. more than 1 second has elapsed since the UE is camped on the serving cell, the UE will monitor the condition for the neighbour cells, and perform the procedure of the cell reselection as illustrated in FIG. 4-7.

Figure 3A:
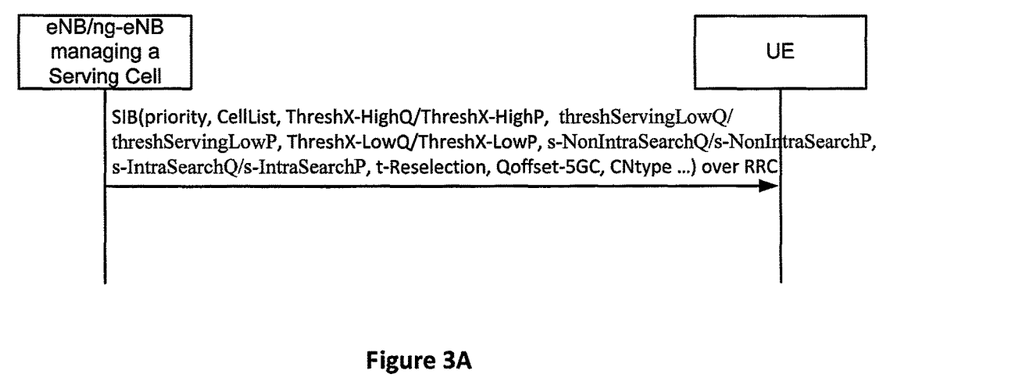
FIGS. 3A and 3B illustrate that a UE receives system information from an eNB/a ng-NB managing a serving cell and/or an eNB/a ng-NB managing a neighbour cell according to one embodiment.

FIGS. 3A and 3B illustrate that a UE receives system information from an eNB/a ng-NB for a serving cell and/or an eNB/a ng-NB for a neighbour cell according to one embodiment. As shown in FIG. 3A, an eNB/a ng-eNB for the serving cell broadcasts/transmits system information to a UE which is in the coverage of the serving cell. The system information includes a few information elements for cell selection and reselection, particularly, in SIB3, SIB4 and SIB5. The system information contains but is not limited to information elements of a cell list ("cellList"), a priority information of frequency ("priority"), a threshold value used by the UE when reselecting towards a higher priority cell ("ThreshX-HighQ"/"ThreshX-HighP"), a threshold value used by the UE for inter-frequency measurements ("s-NonIntraSearchQ"/"s-NonIntraSearchP"), a threshold value used by the UE for intra-frequency measurements ("s-IntraSearchQ"/"s-IntraSearchP"), a threshold value used by the UE on the serving cell when reselecting towards a lower priority cell ("threshServingLowQ"/"threshServingLowP"), a threshold value used by the UE when reselecting towards a lower priority cell ("ThreshX-LowQ"/"ThreshX-LowP"), the time interval applied when the neighbour cell is evaluated for camping ("t-Reselection"), the offset value applied to the cell connected to the 5GC ("Qoffset-5GC") and a network type of the neighbour cells ("CNtype"). The UE can determine whether to perform the procedure of cell reselection according to these parameters. Wherein, 'Q' in the above threshold values represents that the threshold value is based on as RSRQ, and 'P' in the above threshold values represents that the threshold value is based on as RSRP.

Figure 3B:
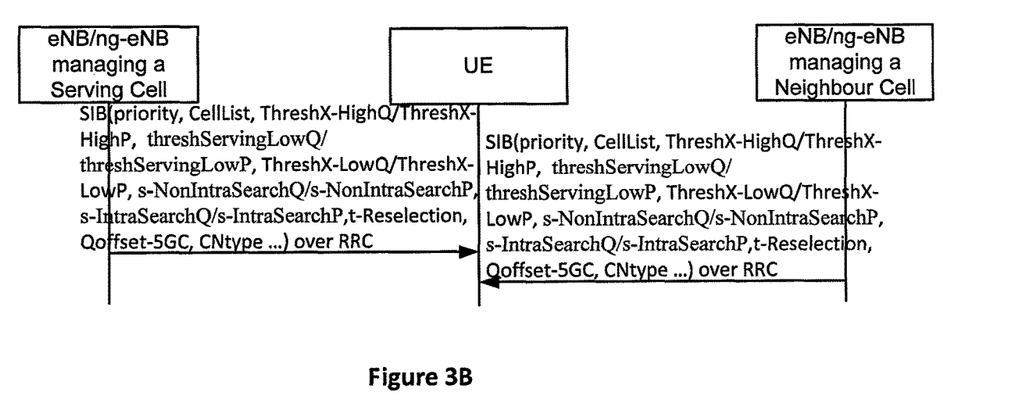

Further, the cell list in the system information includes an identifier of a cell connected to EPC or an identifier of a cell connected to 5GC. Moreover, the identifier is a Physical Cell Identifier ("PCI") of the cell, and the cell indicated in the cell list includes a serving cell for the UE and/or one or more neighbour cells of the serving cell. Further, the priority information indicates the frequency associated with 5GC has a higher priority than the frequency associated with EPC, or the frequency associated with 5GC has a same priority with the frequency associated with EPC FIG. 3B is different with FIG. 3A in that, not only the eNB/ng-eNB for serving cell can broadcasts/transmits the system information to UE, but also the eNB/ng-eNB for neighbour cells can do so. Therefore, the UE is required to monitor neighbour cells for receiving the system information in the context of FIG. 3B.

Figure 4:
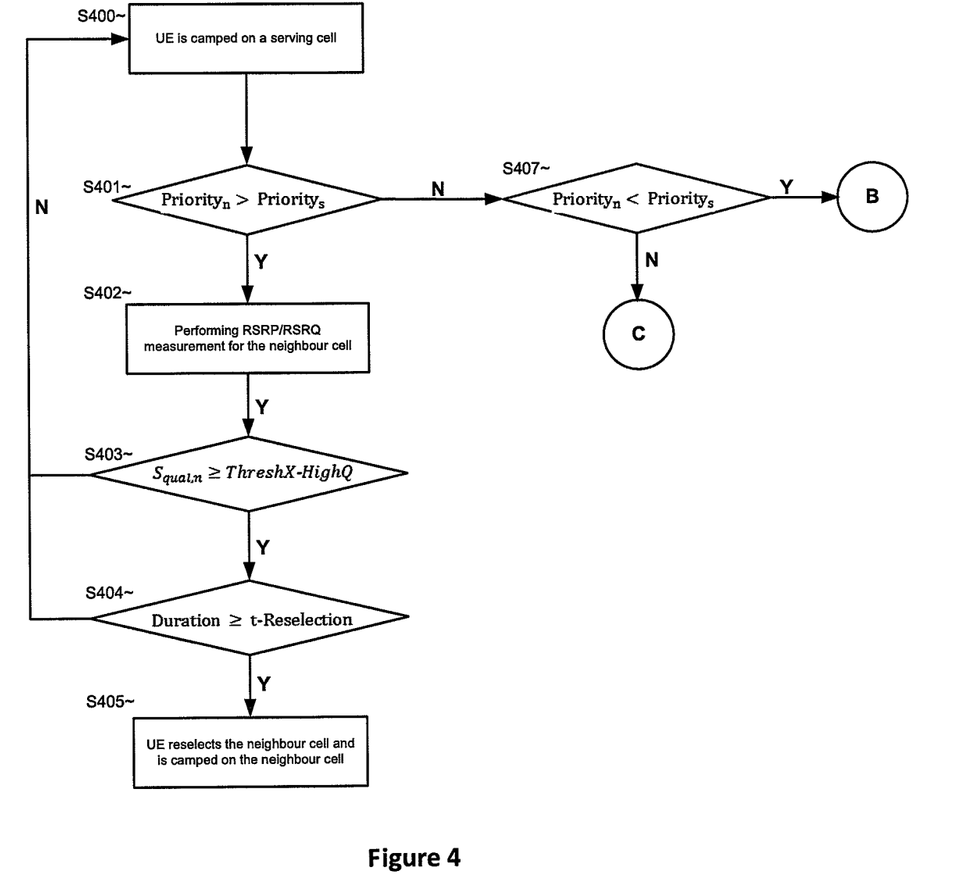
FIG. 4 is a call flow illustrating higher priority inter-frequency cell reselection in the scenario including both EPC and 5GC according to one embodiment.

After the UE completes the procedure of cell selection and is camped on a serving cell, e.g. more than 1 second has elapsed since the UE is camped on the serving cell, the UE may monitor the condition of the neighbour cells to determine whether or not to be camped on the neighbour cell. FIG. 4 is a call flow illustrating higher priority inter-frequency cell reselection in the scenario including both EPC and 5GC according to one embodiment.

As illustrated in FIG. 4, the inter-frequency cell reselection starts at step S400 whereby UE is camped on a serving cell.

In step S401, UE compares the priority of its serving cell and the neighbour cell thereof according to the information elements of priority in the system information. If the priority of the neighbour cell $Priority_n$ is higher than that of the serving cell $Priority_s$ (Y in step S401), the procedure continues to step S402, otherwise continues to step S407 to determine if the priority of the neighbour cell $Priority_n$ is less than that of the serving cell $Priority_s$. If the priority of the neighbour cell $Priority_n$ is less than that of the serving cell $Priority_s$, the UE will detect the wireless signal strength for the neighbour cell with a lower priority, in order to determine whether or not to be camped on the neighbour cell as illustrated in the call flow of FIG. 5. If the priority of the neighbour cell Priority. is equal with that of the serving cell $Priority_s$, the UE will perform the cell-level ranking criteria R for both the serving cell and the neighbour cells, in order to determine whether or not to be camped on the neighbour cell as illustrated in the call flow of FIG. 6.

In step S402, in the case that $Priority_n > Priority_s$, the UE performs the wireless signal measurement based on RSRP/RSRQ for the neighbour cell.

If the cell selection quality value of $S_{qual,n}$ is not less than the threshold value used by the UE when reselecting towards a higher priority cell (Y in step S403), i.e. $S_{qual,n} \geq ThreshX\text{-}HighQ$, or the cell selection RX level value of $S_{rxlev,n}$ is not less than the threshold value used by the UE when reselecting towards a higher priority cell (not shown in FIG. 4), i.e. $S_{rxlev,n} \geq ThreshX\text{-}HighP$, and if the time interval of $S_{qual,n} \geq ThreshX\text{-}HighQ$ is not less than the time interval applied when the neighbour cell is evaluated for camping (Y in step S404), i.e. Duration ≥t-Reselection, the UE will be camped on the neighbour cell having a higher priority of frequency (step S405). Otherwise, the procedure returns back to step S400 whereby UE is still camped on the serving cell.

Further, the calculation of $S_{qual,n}$ and/or $S_{rxlev,n}$ can refer to Equation 1, wherein, n in the subscript represents the criteria S is calculated for the neighbour cells. $S_{qual,n}$ and $S_{rxlev,n}$ represent the measured RSRQ and RSRP values for the neighbour cells respectively, while $S_{qual,s}$ and $S_{rxlev,s}$ represent the measured RSRQ and RSRP values for the serving cells.

Figure 5:
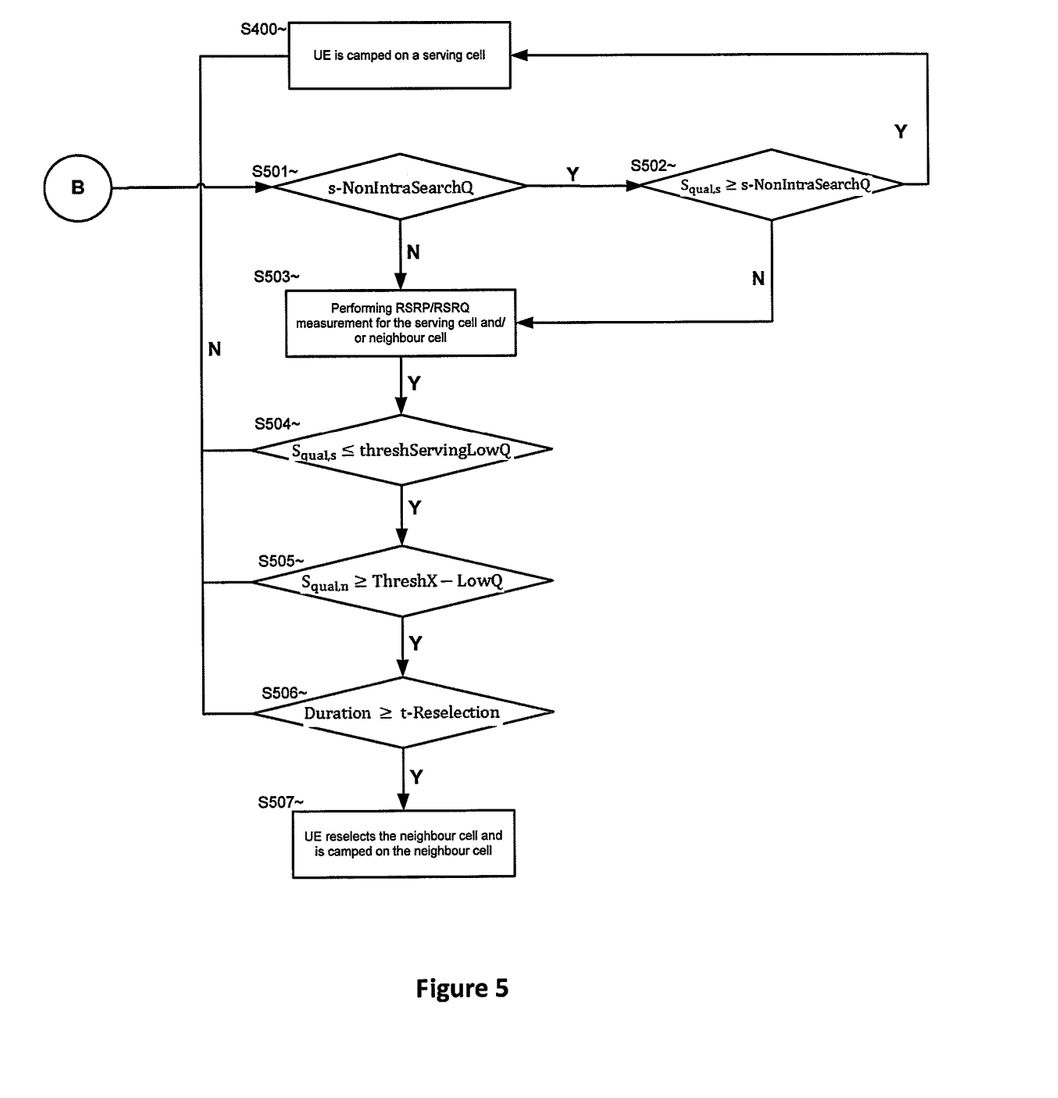
FIG. 5 is a call flow illustrating lower priority inter-frequency cell reselection in the scenario including both EPC and 5GC according to one embodiment.

FIG. 5 is a call flow illustrating lower priority inter-frequency cell reselection in the scenario including both EPC and 5GC according to one embodiment. In the case that the priority of frequency for the neighbour cell is lower than the priority of frequency for the serving cell (Node B in FIG. 4), the procedure illustrated in FIG. 5 is applied.

In step S501, if s-NonIntraSearchQ or s-NonIntraSearchP is present in the system information from eNB/ng-eNB (Y in step S501) to be used as a threshold value for wireless signal measurement on the serving cell with a different frequency from the neighbour cells, the procedure continues to step S502 that the UE determines whether the wireless signal strength based on RSRQ for the serving cell is better than s-NonIntraSearchQ. If $S_{qual,s} \geq$ s-NonintrasearchQ, which means the wireless signal strength for the serving cell is strong enough, the procedure returns back to step S400 that the UE will not perform cell reselection towards a cell with a lower priority as below. On the contrary, if the wireless signal strength based on RSRQ for the serving cell is less than the threshold value of s-NonIntraSearchQ, the procedure continues to step S503 (N in step S502).

In step S503, the UE performs the wireless signal measurement based on RSRP/RSRQ for the serving cell and/or neighbour cell. Alternatively, s-NonIntraSearchP and $S_{rxlev,s}$ based on RSRP can be used to evaluate the wireless signal strength for the serving cell.

In step S501, if neither s-NonIntraSearchQ nor s-NonIntraSearchP is absent in the system information from eNB/ng-eNB (N in step S501), the UE directly performs the wireless signal measurement based on RSRP/RSRQ for the serving cell and/or neighbour cells in step S503.

In step S504, the UE determines whether the wireless signal strength based on RSRQ or RSRP for the serving cell is not larger than the threshold value on the serving cell when reselecting towards a lower priority cell ("threshServingLowQ" or "threshServingLowP"). If $S_{qual,s} \leq$ threshServingLowQ (Y in step S504), which means the wireless signal strength for the serving cell is not strong enough, the procedure continues to step S505. Otherwise, if the wireless signal strength for the serving cell is still acceptable (N in step S505), the procedure returns back to step S400 that the UE is still camped on the serving cell.

In step S505 and S506, if the Cell selection quality value of $S_{qual,n}$ is not less than the threshold value used by the UE when reselecting towards a lower priority cell (Y in step S505), i.e. $S_{qual,n} \geq ThreshX\text{-}LowQ$, and if the time interval of $S_{qual,n} \geq ThreshX\text{-}LowQ$ is not less than the time interval applied when the neighbour cell is evaluated for camping (Y in step S506), i.e. Duration≥t-Reselection, the UE will be camped on the neighbour cell having a lower priority of the frequency (step S507). Otherwise, the procedure returns back to step S400 whereby UE is still camped on the serving cell.

Alternatively, threshServingLowP, ThreshX-LowP and $S_{rxlev,n}$ based on RSRP can be used in steps S504, S505 and S506 for determining whether reselection to a lower priority neighbour with a different frequency from the serving cell.

Figure 6:
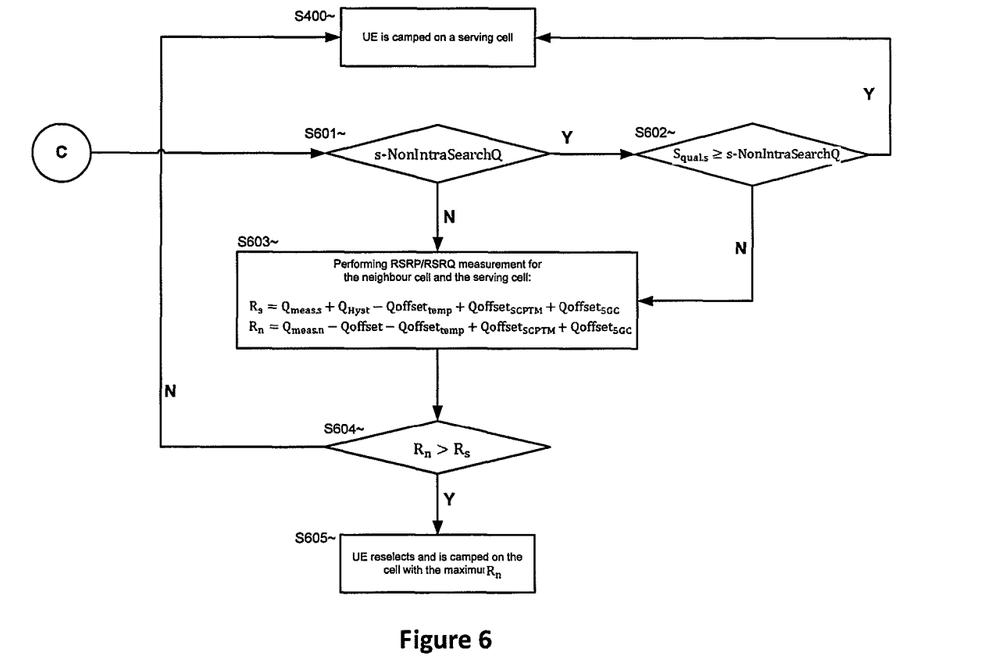
FIG. 6 is a call flow illustrating intra-frequency or equal priority inter-frequency cell reselection in the scenario including both EPC and 5GC according to one embodiment.

FIG. 6 is a call flow illustrating intra-frequency or equal priority inter-frequency cell reselection in the scenario including both EPC and 5GC according to one embodiment. In the case that the priority of frequency for the neighbour cell is equal with the priority of frequency for the serving cell (Node C in FIG. 4), the procedure illustrated in FIG. 6 is applied.

The description of steps 601-602 is similar with that of steps 501-503. Therefore, the description of steps 601-602 is omitted for the purpose of brevity.

In another aspect, in the case that the neighbour cells have a same frequency with the serving cell, the information element of s-IntraSearchQ or s-IntraSearchP is applied instead of s-nonIntraSearchQ or s-nonIntraSearchP respectively while determine whether to perform wireless signal measurement on the serving cell having a same frequency with that of the neighbour cells.

In step S603, the UE performs the wireless signal measurement based on RSRP/RSRQ for both the serving cell and neighbour cell. In the case that the serving cell for the UE has the same priority with the neighbour cells, the cell-level ranking criteria R is implemented. The cell-level ranking criterion $R_s$ for the serving cell and $R_n$ for neighbour cells are defined as follows:

$$R_s = Q_{meas,s} + Q_{Hyst} - Q\text{offset}_{temp} + Q\text{offset}_{SCPTM} + Q\text{offset}_{5GC}$$
$$R_n = Q_{meas,n} - Q\text{offset} - Q\text{offset}_{temp} + Q\text{offset}_{SCPTM} + Q\text{offset}_{5GC} \quad \text{Equation 2}$$

The parameters in Equation 2 are defined as follows

TABLE 2

| | |
|---|---|
| $Q_{meas}$ | RSRP measurement quantity used in cell reselections. |
| Qoffset | For intra-frequency: Equals to Qoffset$_{s,n}$ if Qoffset$_{s,n}$ is valid, otherwise this equals zero. For inter-frequency: Except for NB-IoT, equals to Qoffset$_{s,n}$ plus Qoffset$_{frequency}$, if Qoffset$_{s,n}$ is valid, otherwise this equals Qoffset$_{frequency}$. For NB-IoT equal to QoffsetDedicated$_{frequency}$ for any frequency other than the frequency of the dedicated frequency offset, if QoffsetDedicated$_{frequency}$ is valid, otherwise this equals Qoffset$_{frequency}$ (if QoffsetDedicated$_{frequency}$ is valid Qoffset$_{frequency}$ is not used). |
| Qoffset$_{temp}$ | Offset temporarily applied to a cell |
| Qoffset$_{SCPTM}$ | Offset temporarily applied to an SC-PTM frequency as specified below. The offset is applied to all cells on the SC-PTM frequency. If Qoffset$_{SCPTM}$ is valid, Qoffset for inter-frequency neighbour cells is not used. |
| Qoffset$_{5GC}$ | Offset applied to a cell connected to 5GC |

Wherein, $Q_{meas,s}$ and $Q_{meas,n}$ are the measured RSRP quantity for the serving cell and the neighbour cells respectively. In Equation 2, the parameters other than $Q_{meas,s}$ and $Q_{meas,n}$, especially including Qoffset$_{5GC}$, can be obtained from the system information from eNB/ng-eNB.

Qoffset$_{5GC}$ is an offset value applied to the cell connected to 5GC. That is, if the serving cell is a ng-eNB, Qoffset$_{5GC}$ is applied when calculating the $R_s$ of the serving cell, and if the neighbour cell is a ng-eNB, Qoffset$_{5GC}$ is applied when calculating the $R_n$ of the neighbour cell. The design of Qoffset$_{5GC}$ contributes to the increasing of the cell-level ranking criteria value for the cell connected to 5GC, thus the probability of reselection to the cell connected to 5GC or being camped on the cell connected to 5GC is increased.

In step S604, the UE performs a ranking for all cells including the serving cell and neighbour cells that fulfill the cell selection criterion S defined in Equation 1. And then the UE determines whether the cell-level ranking criteria value $R_n$ for the neighbour cells is larger than the cell-level ranking criteria value $R_s$ for the serving cells. If none of $R_n$ is larger than $R_s$, which means the wireless signal strength for the serving cell is better than that for the neighbour cells, the procedure returns back to step S400 whereby UE is still camped on the serving cell.

In step S605, the cells are ranked according to the value of criteria R defined above. If a cell is ranked as the best cell with the maximum the value of criteria R, the UE performs cell reselection to that cell after more than 1 second has elapsed since the UE camped on the current serving cell. Alternatively, the UE is still camped on the current serving cell in the case that the serving cell has the maximum value of criteria R.

Figure 7:
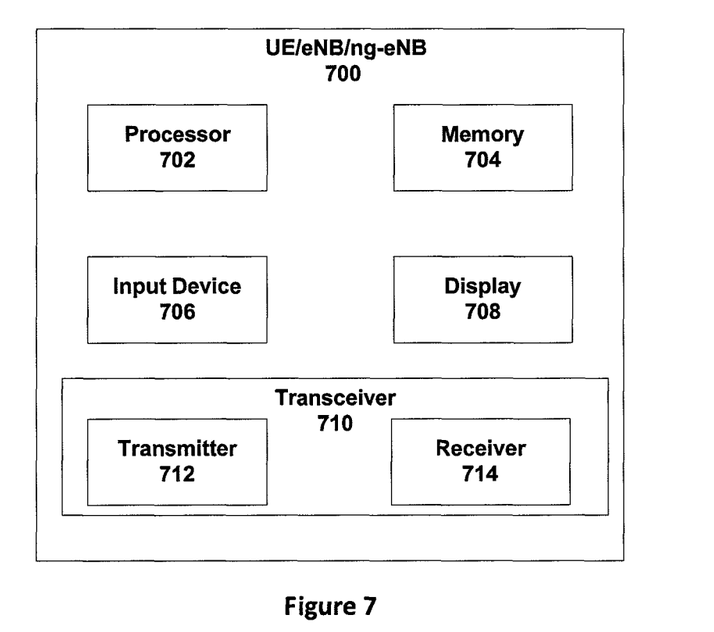
FIG. 7 is a schematic block diagram illustrating components of a UE/eNB/ng-NB according to one embodiment.

FIG. 7 is a schematic block diagram illustrating components of a UE/eNB/ng-NB according to one embodiment.

UE/eNB/ng-eNB 700 is an embodiment of UE/eNB/ng-eNB UE described from FIG. 1 to FIG. 6. Furthermore, UE/eNB/ng-eNB 700 may include a processor 702, a memory 704, and a transceiver 710. In some embodiments, UE/eNB/ng-eNB 700 may include an input device 706 and/or a display 708. In certain embodiments, the input device 706 and the display 708 may be combined into a single device, such as a touch screen.

The processor 702, in one embodiment, may include any known controller capable of executing computer-readable instructions and/or capable of performing logical operations. For example, the processor 702 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 702 executes instructions stored in the memory 704 to perform the methods and routines described herein. The processor 702 is communicatively coupled to the memory 704, the input device 706, the display 708, and the transceiver 710.

In some embodiments, the processor 702 controls the transceiver 710 to receive DL signals from eNB/ng-eNB in the case that the equipment illustrated in FIG. 7 is a UE. For example, the processor 702 may control the transceiver 710 to receive the system information including information elements relating to cell reselection. In certain embodiments, the processor 702 may monitor DL signals received via the transceiver 710 for specific signals. For example, the processor 702 may monitor CPICH for wireless signal strength measurement based on RSRP/RSRQ. In another example, the processor 702 may control the transceiver 710 to transmit a higher layer signaling such as RRC signaling including SIB in the case that the equipment illustrated in FIG. 7 is an eNB/ng-eNB.

The memory 704, in one embodiment, is a computer-readable storage medium. In some embodiments, the memory 704 includes volatile computer storage media. For example, the memory 704 may include RAM, including dynamic RAM ("DRAM"), synchronous dynamic RAM ("SDRAM"), and/or static RAM ("SRAM"). In some embodiments, the memory 704 includes non-volatile computer storage media. For example, the memory 704 may include a hard disk drive, flash memory, or any other suitable non-volatile computer storage device. In some embodiments, the memory 704 includes both volatile and non-volatile computer storage media. In some embodiments, the memory 704 stores data relating to the system information including information elements relating to cell reselection. In some embodiments, the memory 704 also stores program code and related data, such as an operating system or other controller algorithms operating on UE/eNB/ng-eNB 700.

UE/eNB/ng-eNB 700 may optionally include an input device 706. The input device 706, in one embodiment, may include any known computer input device including a touch panel, a button, a keyboard, a stylus, a microphone, or the like. In some embodiments, the input device 706 may be integrated with the display 708, for example, as a touch screen or similar touch-sensitive display. In some embodiments, the input device 706 includes a touch screen such that text may be inputted using a virtual keyboard displayed on the touch screen and/or by handwriting on the touch screen.

In some embodiments, the input device 706 includes two or more different devices, such as a keyboard and a touch panel. In certain embodiments, the input device 706 may include one or more sensors for monitoring an environment of UE/eNB/ng-eNB 700.

UE/eNB/ng-eNB 700 may optionally include a display 708. The display 708, in one embodiment, may include any known electronically controllable display or display device. The display 708 may be designed to output visual, audible, and/or haptic signals. In some embodiments, the display 708 includes an electronic display capable of outputting visual data to a user. For example, the display 708 may include, but is not limited to being, an LCD display, an LED display, an OLED display, a projector, or a similar display device capable of outputting images, text, or the like, to a user. As another non-limiting example, the display 708 may include a wearable display such as a smart watch, smart glasses, a heads-up display, or the like. Further, the display 708 may be a component of a smart phone, a personal digital assistant, a television, a table computer, a notebook (laptop) computer, a personal computer, a vehicle dashboard, or the like.

In certain embodiments, the display 708 may include one or more speakers for producing sound. For example, the display 708 may produce an audible alert or notification (e.g., a beep or chime). In some embodiments, the display 708 includes one or more haptic devices for producing vibrations, motion, or other haptic feedback. In some embodiments, all or portions of the display 708 may be integrated with the input device 706. For example, the input device 706 and display 708 may form a touch screen or similar touch-sensitive display. In other embodiments, the display 708 may be located near the input device 706.

The transceiver 710, in one embodiment, is configured to communicate wirelessly with the eNB/ng-eNB in the case that the equipment illustrated in FIG. 7 is a UE, and vice versa. In certain embodiments, the transceiver 710 comprises a transmitter 712 and a receiver 714. The transmitter 712 is used to transmit UL communication signals to the eNB/ng-eNB and the receiver 714 is used to receive DL communication signals from the eNB/ng-eNB in the case that the equipment illustrated in FIG. 7 is a UE, and vice versa. For example, the receiver 714 may receive the system information from the eNB/ng-eNB. Based on the receiving system information, the transceiver 710 may monitor the wireless signal from the neighbour cells.

The transmitter 712 and the receiver 714 may be any suitable type of transmitter or receiver, respectively. Although only one transmitter 712 and one receiver 714 are illustrated, the transceiver 710 may have any suitable number of transmitters 712 and receivers 714. For example, in some embodiments, UE/eNB/ng-eNB 700 includes a plurality of transmitter 712 and receiver 714 pairs for communicating on a plurality of wireless networks and/or radio frequency bands, each transmitter 712 and receiver 714 pair configured to communicate on a different wireless network and/or radio frequency band than the other transmitter 712 and receiver 714 pairs.

Embodiments may be practiced in other specific forms. The described embodiments are to be considered in all respects only as illustrative and not as restrictive. The scope of the invention is, therefore, indicated by the appended claims rather than by the foregoing description. All changes which fall within the meaning and range of equivalency of the claims are to be embraced within their scope.

The invention claimed is:

1. An apparatus comprising a user equipment, the apparatus further comprising:

a transceiver that receives system information including a cell list from a network equipment, wherein the cell list includes an identifier of a cell connected to an evolved packet core or an identifier of a cell connected to a 5G core, the cell list comprises a plurality of identifiers, the cell list comprises a serving cell and at least one neighbor cell, and each identifier of the plurality of identifiers indicates a corresponding cell of a plurality of cells, wherein:

the system information includes a priority information of frequency, a threshold value, a time interval, an offset value, and/or a network type of the neighbor cell; and the priority information indicates the frequency associated with the 5G core has a higher priority than the frequency associated with the evolved packet core, or the frequency associated with the 5G core has a same priority with the frequency associated with the evolved packet core.

2. The apparatus according to claim 1, wherein the identifier is a Physical Cell Identifier of the cell.

3. The apparatus according to claim 1, wherein:

the threshold value is used by the apparatus if reselecting towards a higher priority cell;

the time interval is applied when the neighbor cell is evaluated for camping; and the offset value is applied to the cell connected to the 5G core.

4. The apparatus according to claim 3, further comprising a processor, wherein:

the transceiver receives a signal from the neighbor cell;

the processor:

performs a wireless signal strength measurement for the neighbor cell in response to the frequency associated with the 5G core having a higher priority than the frequency associated with the evolved packet core; and enables the apparatus to be camped on the neighbor cell in response to the signal strength measurement for the neighbor cell not being less than the threshold value during the time interval.

5. The apparatus according to claim 3, further comprising a processor, wherein:

the transceiver receives a signal from the neighbor cell;

the processor:

performs a wireless signal strength measurement for the serving cell and the neighbor in response to that the frequency associated with the 5G core having a same priority with the frequency associated with the evolved packet core;

calculates a cell-level ranking criteria value for the serving cell and the neighbor cell based on the measured wireless signal strength respectively, the offset value is applied to the cell-level ranking criteria value for the serving cell in the case that the serving cell is connected to the 5G core, and the offset value is applied to the cell-level ranking criteria value for the neighbor cell in the case that the neighbor cell is connected to the 5G core; and enables the apparatus to be camped on the cell with the maximum cell-level ranking criteria value.

6. The apparatus according to claim 5, wherein the cell-level ranking criteria value for the serving cell is also based on one or more pre-defined values.

7. The apparatus according to claim 5, wherein the cell-level ranking criteria value for the neighbor cell is also based on one or more pre-defined values.

8. The apparatus according to claim 1, wherein the network equipment from which the system information is received comprises a network equipment managing a serving cell or a network equipment managing a neighbor cell.

9. A method of a user equipment, the method comprising:
receiving system information including a cell list from a network equipment, wherein the cell list includes an identifier of a cell connected to an evolved packet core or an identifier of a cell connected to a 5G core, the cell list comprises a plurality of identifiers, the cell list comprises a serving cell and at least one neighbor cell, and each identifier of the plurality of identifiers indicates a corresponding cell of a plurality of cells, wherein:
the system information includes a priority information of frequency, a threshold value, a time interval, an offset value, and/or a network type of the neighbor cell; and
the priority information indicates the frequency associated with the 5G core has a higher priority than the frequency associated with the evolved packet core, or the frequency associated with the 5G core has a same priority with the frequency associated with the evolved packet core.

10. The method according to claim 9, wherein the identifier is a Physical Cell Identifier of the cell.

11. The method according to claim 9, wherein:
the threshold value is used by the apparatus if reselecting towards a higher priority cell;
the time interval is applied when the neighbor cell is evaluated for camping; and
the offset value is applied to the cell connected to the 5G core.

12. The method according to claim 11, further comprising:
receiving signal from the neighbor cell;
performing wireless signal strength measurement for the neighbor cell in response to that the frequency associated with the 5G core having a higher priority than the frequency associated with the evolved packet core; and
enabling the apparatus to be camped on the neighbor cell in response to the signal strength measurement for the neighbor cell is not less than the threshold value during the time interval.

13. The method according to claim 11, further comprising:
receiving signal from the neighbor cell;
performing wireless signal strength measurement for the serving cell and the neighbor in response to that the frequency associated with the 5G core having a same priority with the frequency associated with the evolved packet core;
calculating a cell-level ranking criteria value for the serving cell and the neighbor cell based on the measured wireless signal strength respectively, the offset value is applied to the cell-level ranking criteria value for the serving cell in the case that the serving cell is connected to the 5G core, and the offset value is applied to the cell-level ranking criteria value for the neighbor cell in the case that the neighbor cell is connected to the 5G core; and
enabling the apparatus to be camped on the cell with the maximum cell-level ranking criteria value.

14. The method according to claim 13, wherein the cell-level ranking criteria value for the serving cell is also based on one or more pre-defined values.

15. The method according to claim 13, wherein the cell-level ranking criteria value for the neighbor cell is also based on one or more pre-defined values.

16. The method according to claim 9, wherein the network equipment from which the system information is received comprises a network equipment managing a serving cell or a network equipment managing a neighbor cell.

17. An apparatus comprising a network equipment, the apparatus further comprising:
a transceiver that transmits system information including a cell list to a user equipment, wherein:
the cell list includes an identifier of a cell connected to an evolved packet core or an identifier of a cell connected to a 5G core;
the cell list comprises a plurality of identifiers;
the cell list comprises a serving cell and at least one neighbor cell;
each identifier of the plurality of identifiers indicates a corresponding cell of a plurality of cells;
the system information includes a priority information of frequency, a threshold value, a time interval, an offset value, and/or a network type of the neighbor cell; and
the priority information indicates the frequency associated with the 5G core has a higher priority than the frequency associated with the evolved packet core, or the frequency associated with the 5G core has a same priority with the frequency associated with the evolved packet core.

18. The apparatus according to claim 17, wherein the identifier is a Physical Cell Identifier of the cell.

19. The apparatus according to claim 17, wherein:
the threshold value is used by the apparatus if reselecting towards a higher priority cell;
the time interval is applied when the neighbor cell is evaluated for camping; and
the offset value is applied to the cell connected to the 5G core.

20. The apparatus according to claim 17, wherein the network equipment from which the system information is transmitted comprises a network equipment managing a serving cell or a network equipment managing a neighbor cell.

21. The apparatus according to claim 17, wherein the transceiver broadcasts a signal for wireless signal measurement.

22. A method of a network equipment, the method comprising:
transmitting system information including a cell list to a user equipment, wherein:
the cell list includes an identifier of a cell connected to an evolved packet core or an identifier of a cell connected to a 5G core;
the cell list comprises a plurality of identifiers;
the cell list comprises a serving cell and at least one neighbor cell;
each identifier of the plurality of identifiers indicates a corresponding cell of a plurality of cells;
the system information includes a priority information of frequency, a threshold value, a time interval, an offset value, and/or a network type of the neighbor cell; and
the priority information indicates the frequency associated with the 5G core has a higher priority than the frequency associated with the evolved packet core, or the frequency associated with the 5G core has a same priority with the frequency associated with the evolved packet core.

23. The method according to claim 22, wherein the identifier is a Physical Cell Identifier of the cell.

24. The method according to claim 22, wherein:
the threshold value is used by the apparatus when reselecting towards a higher priority cell;
the time interval is applied when the neighbor cell is evaluated for camping; and
the offset value is applied to the cell connected to the 5G core.

25. The method according to claim 22, wherein the network equipment from which the system information is transmitted comprises a network equipment managing a serving cell or a network equipment managing a neighbor cell.

26. The method according to claim 22, further comprising broadcasting a signal for wireless signal measurement.

* * * * *